United States Patent [19]

Caldwell et al.

[11] 4,403,895
[45] Sep. 13, 1983

[54] VEHICLE FLOOR MAT RETAINER

[75] Inventors: David L. Caldwell, Sunfield; Edward C. Schelling, Leslie, both of Mich.

[73] Assignee: General Motors Corporation, Detroit, Mich.

[21] Appl. No.: 269,345

[22] Filed: Jun. 1, 1981

[51] Int. Cl.³ .......................... F16B 5/02; F16B 35/04
[52] U.S. Cl. .................... 411/378; 403/408; 411/908; 411/411
[58] Field of Search ............... 411/378, 394, 411, 423, 411/908, 907, 156; 16/4

[56] References Cited

U.S. PATENT DOCUMENTS

| | | |
|---|---|---|
| 2,779,048 | 1/1957 | Larabell . |
| 3,086,421 | 4/1963 | Hamman .......................... 411/436 |
| 3,391,959 | 7/1968 | Stata . |
| 3,557,654 | 1/1971 | Weidner .......................... 411/378 |
| 4,086,679 | 5/1978 | Butler . |
| 4,104,952 | 8/1978 | Brass .............................. 411/908 |

FOREIGN PATENT DOCUMENTS

| | | | |
|---|---|---|---|
| 1079711 | 4/1960 | Fed. Rep. of Germany | 411/378 |
| 2807606 | 10/1978 | Fed. Rep. of Germany | 411/378 |
| 1243547 | 8/1971 | United Kingdom | 411/378 |
| 1301471 | 12/1972 | United Kingdom | 411/411 |
| 2070179 | 9/1981 | United Kingdom | 411/908 |

*Primary Examiner*—Wayne L. Shedd
*Attorney, Agent, or Firm*—Patrick M. Griffin

[57] ABSTRACT

A floor mat retainer for securing a floor mat to mass backed carpeting of the type having an upper carpet layer bonded to a lower carpet layer. The retainer includes a self-piercing shank having a high lead tapered thread terminating at a lower partial radial shoulder. An upper radial shoulder is spaced from the lower shoulder by a distance less than the distance of the carpet layer. The retainer is self-piercingly threaded into the carpeting until the lower shoulder moves through the carpet layer to thereby press the carpet layer between both shoulders. The length of the shank is less than the distance between the vehicle floor and compressed carpet layer to avoid bulging. A headed portion extends from the upper shoulder and is received through an opening in the floor mat to retain the floor mat in place. The retainer is of one piece molded plastic construction to eliminate rust and corrosion problems.

2 Claims, 4 Drawing Figures

VEHICLE FLOOR MAT RETAINER

BACKGROUND OF THE INVENTION

This invention relates to retainers to releasably hold a vehicle floor mat in place on the carpet of a vehicle and specifically to such a retainer which is self-threadable into the vehicle carpet after installation in the vehicle and releasably cooperates with the floor mat to retain it to the carpet.

Retainers are known in the prior art for retaining a floor mat to the vehicle floor and/or carpet. Strata U.S. Pat. Nos. 3,390,912 and 3,391,959 disclose peripheral frames attached to the vehicle floor and into which the floor mat is fitted. Frames of this type must be positioned independently of the floor mat and require sheet metal screws extending into the floor pan of the vehicle with attendant sealing and corrosion problems. Also, each different size and type of floor mat requires a different size and type of frame. Other known retainers include fasteners which pierce the carpet and are secured underneath the carpet by attachment devices. Such fasteners and attachment devices require assembly before installation of the carpet.

SUMMARY OF THE INVENTION

The floor mat retainer of this invention is of one piece molded construction and is specially designed for use with mass backed carpet of the type including an upper carpet layer directly bonded to a lower padding layer or bonded thereto by a thin layer of urethane. The retainer includes a lower mounting portion and an upper retention portion. The lower mounting portion includes a tapered shank having a tapered high lead thread having its apical end at the self-piercing point of the shank and merging at its basal end into a first partial radial shoulder. An unthreaded neck or shank portion extends upwardly from the first radial shoulder and merges into a larger second full radial shoulder which is axially spaced from the first shoulder. The retention portion includes a neck extending axially from the second shoulder and terminating in a hexagonal head.

To secure the retainer to the carpet, the head of the retainer is fitted into a suitable tool, the self-piercing point located on the carpet at a premarked location, and the retainer is forced against the carpet and simulataneously rotated by the tool so that the point of the shank pierces the carpet layer and the high lead thread initiates threading of the mounting portion through the carpet layer, urethane layer, if present, and padding layer. Once the first radial shoulder moves through the carpet layer and the urethane layer, if present, further rotation of the retainer will have no effect on further threading of the mounting portion through the padding layer. The high lead thread will merely rotate easily within the padding layer upon any such further rotation. Likewise, the first shoulder cannot be moved back through the carpet and urethane layers upon reverse rotation of the retainer so that the retainer is secured to the carpet against removal.

The axial spacing between the radial shoulders is less than the normal thickness of the carpet layer and urethane layer. Thus, the second radial shoulder will start to compress the carpet layer while the thread and first shoulder are moving through the carpet layer and urethane layer, if present. When the first radial shoulder has moved through the carpet layer and urethane layer, if present, the carpet layer and urethane layer, if present, will be compressed between the two radial shoulders and the second shoulder will be recessed within the upper face of the carpet layer. The length of the shank and the shank portion is less than the spacing between the compressed carpet layer and the floor pan of the vehicle to ensure that there will be no engagement of the point of the shank with the floor pan and any bulging of the carpet.

When sufficient retainers are threaded into the carpet, holes or slits in the floor mat are fitted over the head portions of the retainers to attach the floor mat to the retainers. The recessing of the second shoulders into the carpet layer avoids any bulging of the floor mat after it is attached.

Alternately, the head portions of the retainers may be first secured to the floor mat, the floor mat located in place on the carpet, and then the retainers are threaded into the carpet as described. The retention portions rotate relative to the floor mat as the retainers are threaded into the carpet.

Thus, the invention provides a floor mat retainer which is self-threadable into mass backed carpet after the carpet is installed in the vehicle. The retainer does not create any unsightly bulges in the carpet. The retainer may be first installed and then assembled to the floor mat, or the floor mat and retainer installed as a unit. The retainer is of molded one piece plastic construction so that there are no rust or corrosion problems.

DESCRIPTION OF THE DRAWINGS

Other advantages of the invention will appear from the following written description and drawing in which.

DESCRIPTION OF THE PREFERRED EMBODIMENT

Figure 1:
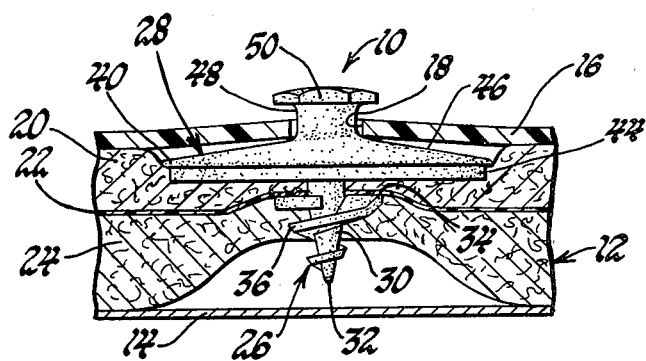
FIG. 1 is a cross-section of a portion of a vehicle floor and carpet and a floor mat retained thereto by a retainer of the invention.

Referring now to FIG. 1, the floor mat retainer of the subject invention designated generally 10, is secured to mass backed carpet 12 installed on the floor 14 of the vehicle. A vehicle floor mat 16 is releasably secured to the retainer by insertion of a portion of the retainer through an opening 18 thereof.

The mass backed carpet 12 generally includes an upper carpet layer 20 which is bonded by a thin urethane layer 22 to a padding layer 24. Such carpet is well known and widely used in the automotive industry. The urethane layer 22 is sometimes dispensed with and the padding layer directly secured to the carpet layer.

Figure 2:
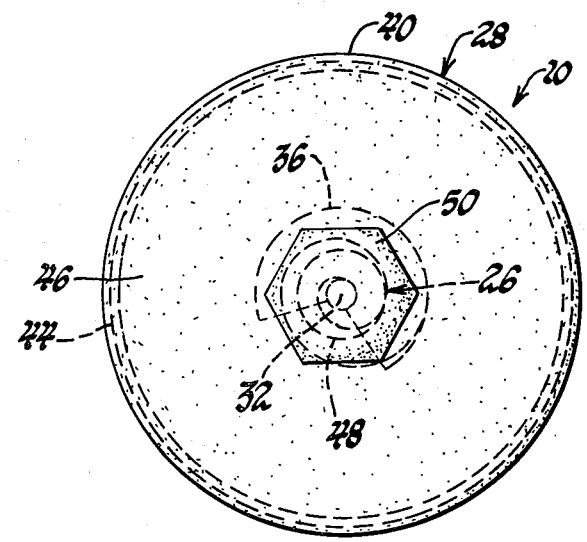
FIG. 2 is an enlarged plan view of the retainer.
Figure 3:
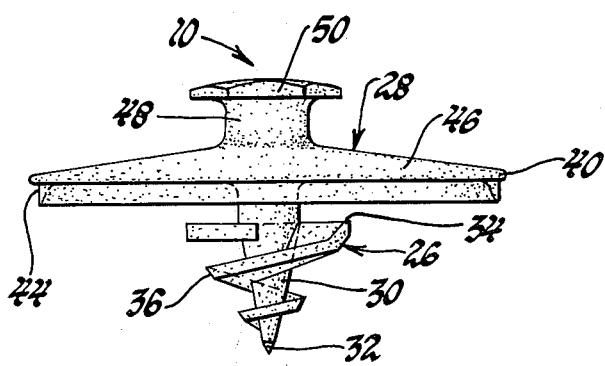
FIG. 3 is an enlarged side elevational view of the retainer.
Figure 4:
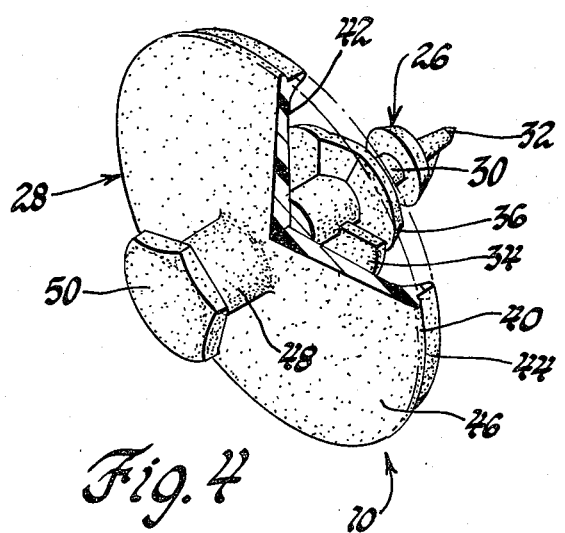
FIG. 4 is a partially cut away perspective view of the retainer.

As best shown in FIGS. 3 and 4, the retainer 10 includes a lower threaded mounting portion 26 and an upper retention portion 28. Portion 26 includes a tapered shank 30 having a self-piercing point 32 at its apical or lower end and a first or lower radially extending partial shoulder 34 adjacent its basal or upper end. An external spiral high lead thread 36 extends between the point 32 and shoulder 34 merges into the shoulder 34 as shown in FIGS. 2 and 3. A second or upper radially extending full shoulder 40 adjacent the upper end of the shank 30 includes a lower flat surface 42 having a peripheral axially extending sharp edged flange 44. The upper surface 46 of shoulder 40 is generally conical and merges into the neck portion 48 of the retention portion 28. The neck portion 48 is coaxial with the shank 30. The neck portion in turn merges into the hexagonal faced upper head 50 of portion 28 which has a slightly crowned upper surface.

Either a pattern or a floor mat with retention holes 18 may be used to mark the locations of the retainers on the carpet layer 20. The number of retainers will, of course, depend upon the shape of the floor mat.

In order to secure the retainer to the carpet, the hexagonal faced head 50 is fitted into a like shaped recess in a suitable manual or power tool and the self-piercing point 32 is pressed into the carpet at premarked points on the carpet layer 20. These points are marked by laying the floor mat 16 in place and marking the position of holes 18 on carpet layer 20. The pressure of point 32 on the carpet and the turning of shank 30 pushes point 32 into carpet layer 20 causing high lead thread 36 to thread shank 30 through carpet layer 20, through urethane layer 22, if present, and into padding layer 24. After radial shoulder 34 has moved past urethane layer 22, shank 30 will rotate easily in padding layer 24 and thread 36 will not thread retainer 10 further into the carpet. In addition, shoulder 34 cannot move relative to urethane layer 22 but will therefore be retained beneath it to prevent retainer 10 from threading back out. Thus, both retention and overtorquing prevention are provided.

Since the distance between radial shoulders 34 and 40 is less than the thickness of carpet layer 20, carpet layer 20 will be compressed therebetween as radial shoulder 34 moves below urethane layer 22. This serves to pull flange 44 into carpet layer 20, compressing it slightly as can be seen in FIG. 1. Furthermore, since the length of shank 30 is less than the thickness of carpet layer 20 and padding layer 24, point 32 is retained off the vehicle floor 14 when retainer 10 is in place. This prevents bulging of the carpet.

When the desired number of retainers 10 are in place, holes 18 in floor mat 16 are fitted over heads 50 to retain the floor mat in place. The above described recessing of shoulder 42 and flange 44 into carpet layer 20 prevents excessive bulging of floor mat 16 and also serves to prevent side to side movement of retainer 10.

As an alternate assembly method, retainers 10 may be first fitted into holes 18 and floor mat 16 laid in place on carpet layer 20. Then, retainers 10 may be inserted into the carpet in the manner just described, as each neck 48 turns freely in a respective hole 18.

Thus, a floor mat retainer has been provided which is self-threadable into previously installed mass backed carpet. The retainer is secured to the carpet without overtorquing, will not thread back out, and creates no bulges in the carpet or the floor mat. Installation may be either separate from or concurrent with laying of the floor mat. The retainer is of one-piece molded plastic construction and obviates any rust or corrosion problems.

The embodiments of the invention in which an exclusive property or privilege is claimed are defined as follows:

1. A retainer for securing a floor mat to mass backed carpet of the type having a carpet layer and a padding layer and installed on a vehicle floor comprising,
    a shank having a length less than the distance between the upper face of the carpet layer and the vehicle floor and including a self-piercing one end to pierce the layers,
    a tapered high lead spiral thread on the shank and merging at its apical end into the self-piercing one end of the shank to self-thread the shank through the carpet layer and into the padding layer,
    the thread merging at its basal end into a first partial shoulder extending radially of the shank and located between the carpet and padding layer when the shank is self-threaded through the carpet layer and into the padding layer,
    a second radial extending shoulder on the shank spaced from the first shoulder a distance less than the thickness of the carpet layer to compress the carpet layer therebetween and recess the second shoulder into the upper face of the carpet layer and locate the self-piercing one end of the shank relative to the vehicle floor and avoid bulging of the carpet, and
    a headed portion extending from the second shoulder and receivable in an opening in the floor mat to thereby seat the floor mat on the second shoulder and retain the floor mat against shifting relative to the carpet layer.

2. A retainer for securing a floor mat to mass backed carpeting of the type having a carpet layer, a padding layer and urethane layer therebetween, comprising,
    a lower shank portion and an upper headed portion coaxial therewith, the length of the shank portion being less than the distance from the carpet layer to the vehicle floor,
    the shank portion including thereon an external high lead thread extending from a self-piercing point at the lower end thereof to a first radially extending shoulder,
    the shank further including an unthreaded portion extending from the first shoulder to a second radially extending shoulder and having a length less than the thickness of the carpet and urethane layer,
    the second radially extending shoulder further including a circumferentially extending flange on the lower side thereof,
    the self-piercing point and high lead thread pulling the shank through the carpet layer and into the padding layer to locate the first shoulder beneath the urethane layer, with the carpet layer compressed between the radially extending shoulders, the point being retained off the vehicle floor to avoid bulging of the carpet, and the peripherally extending flange being compressed into the carpet layer to prevent movement of the retainer and to avoid bulging of the floor mat,
    and a headed portion extending from the second shoulder and receivable through a hole in the floor mat to retain the floor mat to the carpet without movement.

* * * * *